United States Patent
Near et al.

(10) Patent No.: US 9,694,639 B2
(45) Date of Patent: Jul. 4, 2017

(54) DISTRIBUTED ACTIVE SUSPENSION CONTROL SYSTEM

(71) Applicant: Levant Power Corporation, Woburn, MA (US)

(72) Inventors: William G. Near, Boston, MA (US); Vladimir Gorelik, Medford, MA (US); Jonathan R. Leehey, Wayland, MA (US); Marco Giovanardi, Melrose, MA (US); Matthew D. Cole, Boston, MA (US)

(73) Assignee: ClearMotion, Inc., Woburn, MA (US)

( * ) Notice: Subject to any disclaimer, the term of this patent is extended or adjusted under 35 U.S.C. 154(b) by 43 days.

(21) Appl. No.: 14/242,705

(22) Filed: Apr. 1, 2014

(65) Prior Publication Data

US 2014/0297117 A1  Oct. 2, 2014

Related U.S. Application Data

(63) Continuation of application No. PCT/US2014/029654, filed on Mar. 14, 2014.

(Continued)

(51) Int. Cl.
*B60G 17/015* (2006.01)
*B60G 11/26* (2006.01)
(Continued)

(52) U.S. Cl.
CPC .......... *B60G 11/265* (2013.01); *B60G 17/015* (2013.01); *B60G 17/0152* (2013.01);
(Continued)

(58) Field of Classification Search
CPC . B60G 11/00; B60G 17/0152; B60G 17/0195
(Continued)

(56) References Cited

U.S. PATENT DOCUMENTS

| 998,128 A | 7/1911 | Smith |
|---|---|---|
| 1,116,293 A | 11/1914 | Kane |

(Continued)

FOREIGN PATENT DOCUMENTS

| CN | 1325799 A | 12/2001 |
|---|---|---|
| CN | 1370926 A | 9/2002 |

(Continued)

OTHER PUBLICATIONS

U.S. Appl. No. 14/212,238, filed Mar. 14, 2014, Giovanardi et al.
(Continued)

*Primary Examiner* — John Q Nguyen
*Assistant Examiner* — Anshul Sood
(74) *Attorney, Agent, or Firm* — Wolf, Greenfield & Sacks, P.C.

(57) ABSTRACT

A distributed active suspension control system is provided. The control system is based on a distributed, processor-based controller that is coupled to an electronic suspension actuator. The controller processes sensor data at the distributed node, making processing decisions for the wheel actuator it is associated with. Concurrently, multiple distributed controllers on a common network communicate such that vehicle-level control (such as roll mitigation) may be achieved. Local processing at the distributed controller has the advantage of reducing latency and response time to localized sensing and events, while also reducing the processing load and cost requirements of a central node. The topology of the distributed active suspension controller contained herein has been designed to respond to fault modes with fault-safe mechanisms that prevent node-level failure from propagating to system-level fault. Systems, algorithms, and methods for accomplishing this distributed and fault-safe processing are disclosed.

56 Claims, 7 Drawing Sheets

Related U.S. Application Data (60) Provisional application No. 61/913,644, filed on Dec. 9, 2013, provisional application No. 61/865,970, filed on Aug. 14, 2013, provisional application No. 61/815,251, filed on Apr. 23, 2013, provisional application No. 61/789,600, filed on Mar. 15, 2013, provisional application No. 61/930,452, filed on Jan. 22, 2014.

(51) Int. Cl.
| | |
|---|---|
| *H02K 5/12* | (2006.01) |
| *H02P 6/16* | (2016.01) |
| *B60G 17/0195* | (2006.01) |
| *H02K 29/08* | (2006.01) |
| *H02K 29/10* | (2006.01) |
| *H02K 7/14* | (2006.01) |
| *H02K 7/18* | (2006.01) |
| *H02K 11/215* | (2016.01) |
| *H02K 11/22* | (2016.01) |
| *H02K 11/33* | (2016.01) |

(52) U.S. Cl.
CPC ........... *B60G 17/0195* (2013.01); *H02K 5/12* (2013.01); *H02K 7/14* (2013.01); *H02K 7/1823* (2013.01); *H02K 11/215* (2016.01); *H02K 11/22* (2016.01); *H02K 11/33* (2016.01); *H02K 29/08* (2013.01); *H02K 29/10* (2013.01); *H02P 6/16* (2013.01); *B60G 2400/90* (2013.01)

(58) Field of Classification Search
USPC .......................................................... 701/37
See application file for complete search history.

(56) References Cited

U.S. PATENT DOCUMENTS

| | | |
|---|---|---|
| 1,290,293 A | 1/1919 | Morski |
| 2,194,530 A | 3/1940 | Torstensson |
| 2,885,202 A | 5/1959 | Trumper et al. |
| 2,942,581 A | 6/1960 | Gaffney |
| 2,958,292 A | 11/1960 | Lipe et al. |
| 3,507,580 A | 4/1970 | Howard et al. |
| 3,515,889 A | 6/1970 | Kammerer |
| 3,540,482 A | 11/1970 | Fulmer |
| 3,559,027 A | 1/1971 | Arsem |
| 3,688,859 A | 9/1972 | Hudspeth et al. |
| 3,800,202 A | 3/1974 | Oswald |
| 3,803,906 A | 4/1974 | Ross |
| 3,805,833 A | 4/1974 | Teed |
| 3,921,746 A | 11/1975 | Lewus |
| 3,947,004 A | 3/1976 | Taylor |
| 4,032,829 A | 6/1977 | Schenavar |
| 4,033,580 A | 7/1977 | Paris |
| 4,216,420 A | 8/1980 | Jinbo et al. |
| 4,295,538 A | 10/1981 | Lewus |
| 4,401,926 A | 8/1983 | Morton et al. |
| 4,480,709 A | 11/1984 | Commanda |
| 4,500,827 A | 2/1985 | Merritt et al. |
| 4,606,551 A | 8/1986 | Toti et al. |
| 4,625,993 A | 12/1986 | Williams et al. |
| 4,673,194 A | 6/1987 | Sugasawa |
| 4,729,459 A | 3/1988 | Inagaki et al. |
| 4,740,711 A | 4/1988 | Sato et al. |
| 4,815,575 A | 3/1989 | Murty |
| 4,857,755 A | 8/1989 | Comstock |
| 4,868,477 A | 9/1989 | Anderson et al. |
| 4,872,701 A | 10/1989 | Akatsu et al. |
| 4,887,699 A | 12/1989 | Ivers et al. |
| 4,908,553 A | 3/1990 | Hoppie et al. |
| 4,921,080 A | 5/1990 | Lin |
| 4,924,393 A | 5/1990 | Kurosawa |
| 4,936,423 A | 6/1990 | Karnopp |
| 4,981,309 A | 1/1991 | Froeschle et al. |
| 4,992,715 A | 2/1991 | Nakamura et al. |
| 5,034,890 A | 7/1991 | Sugasawa et al. |
| 5,046,309 A | 9/1991 | Yoshino et al. |
| 5,060,959 A | 10/1991 | Davis et al. |
| 5,091,679 A | 2/1992 | Murty et al. |
| 5,098,119 A | 3/1992 | Williams et al. |
| 5,102,161 A | 4/1992 | Williams |
| 5,145,206 A | 9/1992 | Williams |
| 5,203,199 A | 4/1993 | Henderson et al. |
| 5,215,327 A | 6/1993 | Gatter et al. |
| 5,232,242 A | 8/1993 | Bachrach et al. |
| 5,243,525 A | 9/1993 | Tsutsumi et al. |
| 5,276,622 A | 1/1994 | Miller et al. |
| 5,291,960 A | 3/1994 | Brandenburg et al. |
| 5,295,563 A | 3/1994 | Bennett |
| 5,295,705 A | 3/1994 | Butsuen et al. |
| 5,337,560 A | 8/1994 | Abdelmalek et al. |
| 5,353,840 A | 10/1994 | Paley et al. |
| 5,360,445 A | 11/1994 | Goldowsky |
| 5,377,791 A | 1/1995 | Kawashima et al. |
| 5,391,953 A | 2/1995 | Van de Veen |
| 5,425,436 A | 6/1995 | Teramura et al. |
| 5,480,186 A | 1/1996 | Smith |
| 5,497,324 A * | 3/1996 | Henry ................ B60G 17/0157 280/5.503 |
| 5,529,152 A | 6/1996 | Hamilton et al. |
| 5,570,286 A | 10/1996 | Margolis et al. |
| 5,572,425 A | 11/1996 | Levitt et al. |
| 5,590,734 A | 1/1997 | Caires |
| 5,608,308 A | 3/1997 | Kiuchi et al. |
| 5,616,999 A | 4/1997 | Matsumura et al. |
| 5,657,840 A | 8/1997 | Lizell |
| 5,659,205 A | 8/1997 | Weisser et al. |
| 5,682,980 A | 11/1997 | Reybrouck et al. |
| 5,684,383 A | 11/1997 | Tsuji et al. |
| 5,701,245 A | 12/1997 | Ogawa et al. |
| 5,717,303 A | 2/1998 | Engel |
| 5,764,009 A | 6/1998 | Fukaya et al. |
| 5,794,168 A | 8/1998 | Sasaki et al. |
| 5,794,439 A | 8/1998 | Lisniansky |
| 5,839,800 A | 11/1998 | Koga et al. |
| 5,844,388 A | 12/1998 | Maiocchi |
| 5,852,355 A | 12/1998 | Turner |
| 5,856,709 A | 1/1999 | Ibaraki et al. |
| 5,892,293 A | 4/1999 | Lucas |
| 5,941,328 A | 8/1999 | Lyons et al. |
| 5,944,153 A | 8/1999 | Ichimaru |
| 5,962,999 A | 10/1999 | Nakamura et al. |
| 5,987,368 A | 11/1999 | Kamimae et al. |
| 5,999,868 A | 12/1999 | Beno et al. |
| 6,025,665 A | 2/2000 | Poag |
| 6,049,746 A | 4/2000 | Southward et al. |
| 6,092,618 A | 7/2000 | Collier-Hallman |
| 6,111,375 A | 8/2000 | Zenobi |
| 6,161,844 A * | 12/2000 | Charaudeau ....... B60G 17/0157 280/124.1 |
| 6,190,319 B1 | 2/2001 | Goldowsky |
| 6,227,817 B1 | 5/2001 | Paden |
| 6,282,453 B1 | 8/2001 | Lombardi |
| 6,290,034 B1 | 9/2001 | Ichimaru |
| 6,314,353 B1 | 11/2001 | Ohsaku et al. |
| 6,349,543 B1 | 2/2002 | Lisniansky |
| 6,394,238 B1 | 5/2002 | Rogala |
| 6,397,134 B1 | 5/2002 | Shal et al. |
| 6,441,508 B1 | 8/2002 | Hylton |
| 6,452,535 B1 | 9/2002 | Rao et al. |
| 6,502,837 B1 * | 1/2003 | Hamilton ........... B60G 17/0152 280/5.515 |
| 6,519,517 B1 * | 2/2003 | Heyring ............. B60G 21/10 280/124.159 |
| 6,519,939 B1 | 2/2003 | Duff |
| 6,559,553 B2 | 5/2003 | Yumita |
| 6,575,484 B2 | 6/2003 | Rogala et al. |
| 6,592,060 B1 | 7/2003 | Vomhof et al. |
| 6,631,960 B2 | 10/2003 | Grand et al. |
| 6,765,389 B1 | 7/2004 | Moore |
| 6,876,100 B2 | 4/2005 | Yumita |

(56) References Cited

U.S. PATENT DOCUMENTS

| | | |
|---|---|---|
| 6,908,162 B2 | 6/2005 | Obayashi et al. |
| 6,920,951 B2 | 7/2005 | Song et al. |
| 6,944,544 B1 | 9/2005 | Prakah-Asante et al. |
| 6,952,060 B2 | 10/2005 | Goldner |
| 6,964,325 B2 | 11/2005 | Maes |
| 6,973,880 B2 | 12/2005 | Kumar |
| 7,015,594 B2 | 3/2006 | Asada |
| 7,023,107 B2 | 4/2006 | Okuda et al. |
| 7,034,482 B2 | 4/2006 | Komiyama et al. |
| 7,051,526 B2 | 5/2006 | Geiger |
| 7,087,342 B2 | 8/2006 | Song |
| 7,156,406 B2 | 1/2007 | Kraus et al. |
| 7,195,250 B2 | 3/2007 | Knox et al. |
| 7,198,125 B2 | 4/2007 | Skelcher et al. |
| 7,206,678 B2 | 4/2007 | Arduc et al. |
| 7,335,999 B2 | 2/2008 | Potter |
| 7,336,002 B2 | 2/2008 | Kato et al. |
| 7,392,998 B2 | 7/2008 | Runkel |
| 7,421,954 B2 | 9/2008 | Bose |
| 7,427,072 B2 | 9/2008 | Brown |
| 7,513,490 B2 | 4/2009 | Robertson |
| 7,533,890 B2 | 5/2009 | Chiao |
| 7,656,055 B2 | 2/2010 | Torres et al. |
| 7,722,056 B2 | 5/2010 | Inoue et al. |
| 7,854,203 B2 | 12/2010 | Kumar |
| 7,936,113 B2 | 5/2011 | Namuduri et al. |
| 7,938,217 B2 | 5/2011 | Stansbury |
| 7,963,529 B2 | 6/2011 | Oteman et al. |
| 8,063,498 B2 | 11/2011 | Namuduri et al. |
| 8,067,863 B2 | 11/2011 | Giovanardi |
| 8,079,436 B2 | 12/2011 | Tikkanen et al. |
| 8,080,888 B1 | 12/2011 | Daley |
| 8,143,766 B2 | 3/2012 | Namuduri et al. |
| 8,167,319 B2 | 5/2012 | Ogawa |
| 8,253,281 B2 | 8/2012 | Namuduri et al. |
| 8,255,117 B2 | 8/2012 | Bujak et al. |
| 8,269,359 B2 | 9/2012 | Boisvert et al. |
| 8,269,360 B2 | 9/2012 | Boisvert et al. |
| 8,376,100 B2 | 2/2013 | Avadhany et al. |
| 8,380,416 B2 | 2/2013 | Offerle et al. |
| 8,392,030 B2 | 3/2013 | Anderson et al. |
| 8,453,809 B2 | 6/2013 | Hall |
| 8,475,137 B2 | 7/2013 | Kobayashi et al. |
| 8,548,678 B2 | 10/2013 | Ummethala et al. |
| 8,590,679 B2 | 11/2013 | Hall |
| 8,596,055 B2 | 12/2013 | Kadlicko |
| 8,672,337 B2 | 3/2014 | van der Knaap et al. |
| 8,776,961 B2 | 7/2014 | Mori et al. |
| 8,820,064 B2 | 9/2014 | Six et al. |
| 8,839,920 B2 | 9/2014 | Bavetta et al. |
| 8,840,118 B1 | 9/2014 | Giovanardi et al. |
| 8,841,786 B2 | 9/2014 | Tucker et al. |
| 8,892,304 B2 | 11/2014 | Lu et al. |
| 8,966,889 B2 | 3/2015 | Six |
| 9,108,484 B2 | 8/2015 | Reybrouck |
| 9,174,508 B2 | 11/2015 | Anderson et al. |
| 9,205,718 B2 | 12/2015 | Lee |
| 9,260,011 B2 | 2/2016 | Anderson et al. |
| 2001/0033047 A1 | 10/2001 | Beck et al. |
| 2002/0047273 A1 | 4/2002 | Burns et al. |
| 2002/0060551 A1 | 5/2002 | Ikeda |
| 2002/0070510 A1 | 6/2002 | Rogala |
| 2002/0074175 A1 | 6/2002 | Bloxham |
| 2002/0128072 A1 | 9/2002 | Terpay et al. |
| 2002/0145404 A1 | 10/2002 | Dasgupta et al. |
| 2002/0183907 A1 | 12/2002 | Stiller |
| 2003/0000765 A1 | 1/2003 | Spadafora |
| 2003/0034697 A1 | 2/2003 | Goldner et al. |
| 2003/0077183 A1 | 4/2003 | Franchet et al. |
| 2003/0150352 A1 | 8/2003 | Kumar |
| 2003/0169048 A1 | 9/2003 | Kim et al. |
| 2004/0083629 A1 | 5/2004 | Kondou |
| 2004/0096334 A1 | 5/2004 | Aldinger et al. |
| 2004/0119289 A1 | 6/2004 | Zabramny |
| 2004/0206559 A1 | 10/2004 | Song et al. |
| 2004/0207350 A1 | 10/2004 | Wilton et al. |
| 2004/0211631 A1 | 10/2004 | Hsu |
| 2004/0212273 A1 | 10/2004 | Gould |
| 2005/0017462 A1* | 1/2005 | Kroppe ............... B60G 17/015 280/5.507 |
| 2005/0098399 A1 | 5/2005 | Bremner |
| 2005/0121268 A1 | 6/2005 | Groves et al. |
| 2005/0178628 A1 | 8/2005 | Uchino et al. |
| 2005/0246082 A1 | 11/2005 | Miki et al. |
| 2005/0280318 A1 | 12/2005 | Parison et al. |
| 2006/0090462 A1 | 5/2006 | Yoshino |
| 2006/0178808 A1 | 8/2006 | Wu et al. |
| 2006/0239849 A1 | 10/2006 | Heltzapple et al. |
| 2007/0018626 A1 | 1/2007 | Chi |
| 2007/0021886 A1* | 1/2007 | Miyajima ............ B60G 17/019 701/37 |
| 2007/0088475 A1 | 4/2007 | Nordgren et al. |
| 2007/0089919 A1 | 4/2007 | de la Torre et al. |
| 2007/0089924 A1 | 4/2007 | de la Torre et al. |
| 2007/0120332 A1 | 5/2007 | Bushko et al. |
| 2007/0170680 A1 | 7/2007 | van der Knaap et al. |
| 2007/0233279 A1 | 10/2007 | Kazerooni et al. |
| 2008/0004771 A1 | 1/2008 | Masamura |
| 2008/0012262 A1 | 1/2008 | Carabelli |
| 2008/0111324 A1 | 5/2008 | Davis |
| 2008/0190104 A1 | 8/2008 | Bresie |
| 2008/0234900 A1 | 9/2008 | Bennett |
| 2008/0238004 A1 | 10/2008 | Turco et al. |
| 2008/0238396 A1 | 10/2008 | Ng et al. |
| 2008/0257626 A1 | 10/2008 | Carabelli et al. |
| 2008/0265808 A1 | 10/2008 | Sparey et al. |
| 2009/0015202 A1 | 1/2009 | Miura et al. |
| 2009/0192674 A1 | 7/2009 | Simons |
| 2009/0212649 A1 | 8/2009 | Kingman et al. |
| 2009/0229902 A1 | 9/2009 | Stansbury |
| 2009/0230688 A1 | 9/2009 | Torres et al. |
| 2009/0234537 A1 | 9/2009 | Tomida et al. |
| 2009/0260935 A1 | 10/2009 | Avadhany et al. |
| 2010/0013229 A1 | 1/2010 | Da Costa |
| 2010/0044978 A1 | 2/2010 | Delorenzis et al. |
| 2010/0072760 A1* | 3/2010 | Anderson ............. B60G 13/14 290/1 R |
| 2010/0115936 A1 | 5/2010 | Williamson et al. |
| 2010/0217491 A1 | 8/2010 | Naito et al. |
| 2010/0244457 A1 | 9/2010 | Bhat et al. |
| 2010/0262308 A1 | 10/2010 | Anderson et al. |
| 2010/0308589 A1 | 12/2010 | Rohrer |
| 2011/0024601 A1 | 2/2011 | Shoemaker et al. |
| 2011/0057478 A1 | 3/2011 | van der Knaap et al. |
| 2011/0062904 A1 | 3/2011 | Egami |
| 2011/0127127 A1 | 6/2011 | Hirao et al. |
| 2011/0162903 A1 | 7/2011 | Stragier |
| 2011/0303049 A1 | 12/2011 | Neelakantan et al. |
| 2012/0010780 A1 | 1/2012 | Hayashi et al. |
| 2012/0055745 A1 | 3/2012 | Buettner et al. |
| 2012/0063922 A1 | 3/2012 | Sano et al. |
| 2012/0067037 A1 | 3/2012 | Bohrer et al. |
| 2012/0078470 A1 | 3/2012 | Hirao et al. |
| 2012/0181757 A1 | 7/2012 | Oteman et al. |
| 2012/0230850 A1 | 9/2012 | Kawano et al. |
| 2012/0233991 A1 | 9/2012 | Ivantysynova et al. |
| 2012/0305347 A1 | 12/2012 | Mori et al. |
| 2013/0081382 A1 | 4/2013 | Nelson et al. |
| 2013/0147205 A1 | 6/2013 | Tucker et al. |
| 2013/0154280 A1 | 6/2013 | Wendell et al. |
| 2013/0221625 A1 | 8/2013 | Pare et al. |
| 2013/0264158 A1 | 10/2013 | Hall |
| 2014/0005888 A1 | 1/2014 | Bose et al. |
| 2014/0012467 A1 | 1/2014 | Knox et al. |
| 2014/0012468 A1 | 1/2014 | Le et al. |
| 2014/0095022 A1 | 4/2014 | Cashman et al. |
| 2014/0260233 A1 | 9/2014 | Giovanardi et al. |
| 2014/0265169 A1 | 9/2014 | Giovanardi et al. |
| 2014/0265170 A1 | 9/2014 | Giovanardi et al. |
| 2014/0271066 A1 | 9/2014 | Hou |
| 2014/0288776 A1 | 9/2014 | Anderson et al. |
| 2014/0294601 A1 | 10/2014 | O'Shea et al. |
| 2014/0294625 A1 | 10/2014 | Tucker et al. |
| 2014/0297113 A1 | 10/2014 | Zuckerman et al. |

(56) References Cited

U.S. PATENT DOCUMENTS

| | | |
|---|---|---|
| 2014/0297116 A1 | 10/2014 | Anderson et al. |
| 2014/0297119 A1 | 10/2014 | Giovanardi et al. |
| 2014/0346783 A1 | 11/2014 | Anderson et al. |
| 2015/0059325 A1 | 3/2015 | Knussman et al. |
| 2015/0114739 A1 | 4/2015 | Newman |
| 2015/0192114 A1 | 7/2015 | Triebel et al. |
| 2015/0224845 A1 | 8/2015 | Anderson et al. |
| 2015/0316039 A1 | 11/2015 | Tucker et al. |
| 2016/0031285 A1 | 2/2016 | Tucker et al. |
| 2016/0059664 A1 | 3/2016 | Tucker et al. |
| 2016/0075205 A1 | 3/2016 | Anderson et al. |
| 2016/0097406 A1 | 4/2016 | Zuckerman et al. |
| 2016/0114643 A1 | 4/2016 | Anderson et al. |

FOREIGN PATENT DOCUMENTS

| | | |
|---|---|---|
| CN | 2707546 Y | 7/2005 |
| CN | 101104381 A | 1/2008 |
| CN | 201002520 Y | 1/2008 |
| CN | 101749353 A | 6/2010 |
| DE | 3937987 A1 | 5/1991 |
| DE | 195 35 752 A1 | 3/1997 |
| EP | 0 363 158 A2 | 4/1990 |
| EP | 1878598 | 1/2008 |
| EP | 2 131 072 A1 | 12/2009 |
| EP | 2 136 055 A1 | 12/2009 |
| EP | 2 541 070 A1 | 1/2013 |
| FR | 2152111 A | 4/1973 |
| FR | 2346176 A | 10/1977 |
| FR | 2661643 A1 | 11/1991 |
| GB | 652732 | 5/1951 |
| GB | 1070783 | 6/1967 |
| JP | S22-3510 U | 12/1947 |
| JP | S59-187124 A | 10/1984 |
| JP | H3-123981 U1 | 12/1991 |
| JP | H05-50195 U | 7/1993 |
| JP | 8-226377 A2 | 9/1996 |
| JP | H11-166474 A | 6/1999 |
| JP | 2001-311452 A | 9/2001 |
| JP | 2003/035254 | 2/2003 |
| JP | 2005-521820 | 7/2005 |
| JP | 2008-536470 A | 9/2008 |
| JP | 2009-115301 A | 5/2009 |
| WO | WO 97/26145 A | 7/1997 |
| WO | WO 2007/071362 A1 | 6/2007 |
| WO | WO 2011/159874 A2 | 12/2011 |
| WO | WO 2012/167316 A1 | 12/2012 |

OTHER PUBLICATIONS

U.S. Appl. No. 14/212,359, filed Mar. 14, 2014, Giovanardi et al.
U.S. Appl. No. 14/212,443, filed Mar. 14, 2014, Giovanardi et al.
U.S. Appl. No. 14/213,860, filed Mar. 14, 2014, Anderson et al.
U.S. Appl. No. 14/212,521, filed Mar. 14, 2014, Giovanardi et al.
U.S. Appl. No. 14/242,612, filed Apr. 1, 2014, Tucker et al.
U.S. Appl. No. 14/242,636, filed Apr. 1, 2014, O'Shea et al.
U.S. Appl. No. 14/242,658, filed Apr. 1, 2014, Zuckerman et al.
U.S. Appl. No. 14/242,691, filed Apr. 1, 2014, Anderson et al.
U.S. Appl. No. 14/242,715, filed Apr. 1, 2014, Giovanardi et al.
PCT/US2009/040749, Jul. 15, 2009, International Search Report and Written Opinion.
PCT/US2009/040749, Oct. 28, 2010, International Preliminary Report on Patentability.
PCT/US2010/002116, Feb. 16, 2012, International Preliminary Report on Patentability.
PCT/US2010/002116, Oct. 28, 2010, International Search Report and Written Opinion.
PCT/US2010/002105, Mar. 8, 2012, International Preliminary Report on Patentability.
PCT/US2010/002105, Dec. 30, 2011, International Search Report and Written Opinion.
PCT/US2011/040654, Oct. 26, 2011, Invitation to Pay Additional Fees.
PCT/US2011/040654, Jan. 3, 2013, International Preliminary Report on Patentability.
PCT/US2011/040654, Jan. 27, 2012, International Search Report and Written Opinion.
[No Author Listed] Ride control innovation, accelerated$^{SM}$. Forward thinking. Forward moving. ACOCAR. Tenneco. Sep. 2011.
Kaminaga et al., Mechanism and Control of knee power augmenting device with backdrivable electro-hydrostatic actuator. 13th World congress Mechanism Machine Science. Jun. 19-25, 2011. 1-10.
McGehee et al., Hydraulic accumulators tame shock and vibration. News content from Machine Design. Mar. 2, 2011. 9 pages.
Vandersmissen, ACOCAR active suspension. Vehicle Dynamics Expo. Stuttgart, Jul. 5, 2008. 24 pages.
Vandersmissen et al., The new Tenneco ACOCAR active suspension. Vehicle Dynamics Expo. Stuttgart, Jun. 22-24, 2010. 19 pages.
U.S. Appl. No. 14/681,630, filed Apr. 8, 2015, Tucker et al.
U.S. Appl. No. 14/602,463, filed Jan. 22, 2015, Anderson et al.
PCT/US2014/029654, mailed Aug. 14, 2014, Invitation to Pay Additional Fes.
PCT/US2014/029654, mailed Oct. 29, 2014, International Search Report and Written Opinion.
Cleasby et al., A novel high efficiency electrohydrostatic flight simulator motion system. Fluid Pow Mot Control. Centre for PTMC, UK. 2008;437-449.
Shen et al., Automative electric power and energy mangement—a system approach. Business Briefing: Global Automotive Manufacturing and Technology. 2003:1-5.
U.S. Appl. No. 14/989,725, filed Jan. 6, 2016, Anderson et al.
U.S. Appl. No. 14/859,892, filed Sep. 21, 2015, Anderson et al.
U.S. Appl. No. 14/777,068, filed Sep. 15, 2015, Tucker et al.
U.S. Appl. No. 14/786,414, filed Oct. 22, 2015, Tucker et al.
U.S. Appl. No. 14/750,357, filed Jun. 25, 2015, Giarratana et al.
U.S. Appl. No. 14/801,787, filed Jul. 16, 2015, Tucker et al.
U.S. Appl. No. 14/876,796, filed Oct. 6, 2015, Zuckerman et al.
U.S. Appl. No. 14/800,201, filed Jul. 15, 2015, Giarratana et al.
PCT/US2014/027389, mailed Oct. 1, 2014, International Search Report and Written Opinion.
PCT/US2016/014565, mailed May 27, 2016, International Search Report and Written Opinion.

* cited by examiner

DISTRIBUTED ACTIVE SUSPENSION CONTROL SYSTEM

CROSS-REFERENCE TO RELATED APPLICATIONS

This application is a continuation of International Application PCT/US2014/029654, entitled "ACTIVE VEHICLE SUSPENSION IMPROVEMENTS", filed Mar. 14, 2014, which claims the benefit under 35 U.S.C. §119(e) of U.S. provisional application Ser. No. 61/913,644, entitled "WIDE BAND HYDRAULIC RIPPLE NOISE BUFFER", filed Dec. 9, 2013, U.S. provisional application Ser. No. 61/865,970, entitled "MULTI-PATH FLUID DIVERTER VALVE", filed Aug. 14, 2013, U.S. provisional application Ser. No. 61/815,251, entitled "ACTIVE SUSPENSION", filed Apr. 23, 2013, and U.S. provisional application Ser. No. 61/789,600, entitled "ACTIVE SUSPENSION", filed Mar. 15, 2013, the disclosures of which are incorporated by reference in their entirety. This application also claims the benefit under 35 U.S.C. §119(e) of U.S. provisional application Ser. No. 61/930,452, entitled "ELECTROHYDRAULIC SYSTEMS", filed Jan. 22, 2014, the disclosure of which is incorporated by reference in its entirety.

BACKGROUND

Field

Disclosed embodiments are related to highly-integrated, distributed networks of fault-tolerant actuator controllers for a vehicular active suspension control system.

Discussion of Related Art

Active suspension technologies for vehicular applications are generally categorized as semi-active and fully-active. Semi-active systems modulate mechanical stiffness of the damper according to changing road conditions. Fully-active systems have traditionally utilized actuators to raise or lower the vehicle's chassis allowing more control of ride quality and handling.

There are two primary types of fully active suspension systems: hydraulic and electromagnetic. Hydraulic-based active suspension systems typically use a high pressure pump and an electronic controller that maintain and control desired fluid flow to a hydraulic actuator. Electromagnetic-based fully active suspension systems command a force and velocity profile to a linear electric motor actuator. In both cases an actuator is directly connected to a vertically moving wheel and affects the motion of the associated wheel that is directly connected to a wheel suspension assembly.

Depending on the specific implementation of an active suspension, an actuator receives power and control signals from a controller and provides a force or position of the actuators. Vehicular active suspension actuators use control inputs and an external power source to produce a desired force-velocity response in at least three operational quadrants.

SUMMARY

Unlike most vehicular systems, active suspension power handling is characterized by a unique need to produce and absorb large energy spikes while delivering desired performance at acceptable cost. Furthermore, unlike most vehicular systems, suspension is not a stand-alone and independent function, it is rather a vehicle-wide function with each wheel actuated independently while having some interplay with the actual and anticipated motions of other wheels and the vehicle's body. The methods and systems disclosed herein are based on an appreciation of the needs dictated by improved vehicle dynamics, safety consideration, vehicle integration complexities and cost of implementation and ownership, as well as the limitations of existing active suspension actuators. To achieve maximum performance from a fully-active suspension actuator, a control system architecture that involves a low-latency communication network between units distributed across the vehicle body is described.

One objective of the present methods and systems of distributed active suspension control described herein is to improve performance of active suspension systems based on hydraulics, electromagnetics, electro-hydraulics, or other suitable systems by reducing latency and improving response time, reducing central processing requirements, and improving fault-tolerance and reliability.

Aspects relate to distributed, fault-tolerant controllers and distributed processing algorithms for active suspension control technologies.

According to one aspect, a distributed suspension control system comprises a number of active suspension actuators (which, in some embodiments, may be valveless, hydraulic, linear motor, ball screw, valved hydraulic, or other actuators) that are disposed throughout a vehicle such that each active suspension actuator is associated with a single wheel. The actuator operates by converting applied energy into motion of a wheel. In one embodiment, the actuator may comprise a multi-phase electric motor for controlling suspension activity of a wheel, and the actuator may be disposed within a wheel-well of a vehicle between the vehicle's chassis and the vehicle's wheel. The vehicle's chassis may be a chassis of any wheeled vehicle, but in at least some embodiments, the vehicle chassis is a car body, a truck chassis, or a truck cabin. Further, each actuator comprises an active suspension actuator controller operably coupled to a corresponding actuator (which, in some embodiments, may be to control torque, displacement, or force). Each controller has processing capability that executes wheel-specific and vehicle-specific algorithms, and in one embodiment, each controller may run substantially similar control algorithms such that any two distributed actuator-controller pairs may be expected to produce similar actuator outputs given the same controller inputs. Further, the active suspension control system comprising a number of actuator-controller pairs disposed throughout the vehicle also forms a network for facilitating communication, control, and sensing information among all of the controllers. The system also comprises at least one sensor which, in some embodiments, may be an accelerometer, a displacement sensor, a force sensor, a gyroscope, a temperature sensor, a pressure sensor, etc. disposed with each controller to provide vehicle chassis motion and/or vehicle wheel motion related information to the controller. The controller acts to process the sensor information and to execute a wheel-specific suspension protocol to control a corresponding wheel's vertical motions. In one embodiment, the wheel-specific suspension protocol may comprise suspension actions that facilitate keeping the vehicle chassis substantially level during at least one control mode, while maintaining wheel contact with the road surface. In another embodiment, the wheel-specific suspension protocol may comprise suspension actions that dampen wheel movement while mitigating an impact of road surface on wheel movement and consequently on the vehicle vertical motions. In one embodiment, the wheel-specific suspension protocol may measure the actuator inertia used in a feedback loop to control the single wheel motion. In one embodiment, the wheel-specific suspension protocol may comprise two algorithms, one for wheel control and the other for vehicle chassis/body control. Further the controller processes information received over the communication network from any other controller to execute a vehicle-wide suspension protocol to cooperatively control vehicle motion. In one embodiment, the vehicle-wide suspension protocol may be effected by each controller controlling the single wheel with which it is associated. Also, in one embodiment, the vehicle-wide suspension protocol may facilitate control of vehicle roll, pitch, and vertical acceleration.

According to another aspect, a distributed active valve system comprises a number of active suspension actuators (which, in some embodiments, may be valveless, hydraulic, linear motor, ball screw, valved hydraulic, or other actuators) that are disposed throughout a vehicle such that each active suspension actuator is associated with a single wheel. Each actuator comprises an electric motor operatively coupled to a hydraulic pump that communicates with hydraulic fluid that moves a piston of the actuator. Each actuator behaves by converting applied energy into a vertical motion of a single wheel in an overall suspension architecture. Further, each actuator comprises a separate active suspension actuator controller operably coupled to control torque/velocity to the electric motor thereby causing rotation capable of both resisting and assisting the hydraulic pump. The distributed active valve system comprising a number of actuator-controller pairs disposed throughout the vehicle also comprises a communication network for facilitating communication of vehicle control and sensing information among all of the controllers. The system also comprises at least one sensor (which, in some embodiments, may be an accelerometer, displacement sensor, force sensor, gyroscope, etc.) disposed with each controller to provide vehicle chassis motion and/or vehicle wheel motion related information to the controller with which the sensor is disposed. Each controller executes wheel-specific suspension protocols and vehicle-wide suspension protocols to cooperatively control vehicle motion. In one embodiment, wheel-specific suspension protocols may perform groundhook control of the wheel to improve damping of an unsprung wheel mass (that is, control that is adapted to maintain contact of the wheel with the ground under conditions that might otherwise results in the wheel losing contact). In one embodiment, wheel-specific suspension protocols may control the actuator at wheel frequencies. In one embodiment, vehicle-wide suspension protocols may perform skyhook control (that is, control adapted to maintain a relatively steady position of the vehicle cabin notwithstanding up and down motion of the wheels), active roll control, and/or pitch control. Further, in one embodiment vehicle-wide suspension protocols may control the actuator at body frequencies.

According to another aspect, a distributed active valve system comprises a number of active suspension actuators (which, in some embodiments, may be valveless, hydraulic, linear motor, ball screw, valved hydraulic, or other actuators) that are disposed throughout a vehicle such that each active suspension actuator is associated with a single wheel. Each actuator comprises a separate active suspension actuator controller, and in one embodiment, the controller may comprise a motor controller which applies torque to the active suspension system actuator. Further the distributed active valve system comprises a communication network for facilitating communication of vehicle control and sensing information among the actuator controllers. In some embodiments, the communication network may be a CAN bus, FlexRay, Ethernet, RS-485, or data-over-power-lines communication bus. The system also comprises at least one sensor (which, in some embodiments, may be an accelerometer, displacement sensor, force sensor, gyroscope, etc.) disposed with each controller to provide vehicle chassis motion and/or vehicle wheel motion related information to the controller with which the sensor is disposed. Further the active valve system comprises a localized energy storage facility for each active suspension system actuator. In one embodiment, the localized energy storage facility may be one or more capacitors operatively coupled to the controller to store electrical energy. In another embodiment, the active suspension system actuators may be capable of both consuming energy and supplying energy to the energy storage facility independently of the other actuators. The energy may be supplied by transferring energy harvested from an electric motor operating in a regenerative mode. In addition to the localized energy storage, in one embodiment, the system may comprise a centralized energy storage facility. Energy may be able to flow out from the centralized energy storage to the actuators over a power bus and energy may be able to flow into the energy storage from a vehicular high power electrical system, the vehicle primary electrical system, a DC-DC converter, or a regenerative active suspension actuator. In one embodiment of the system, each controller may be capable of independently detecting and responding to loss of power conditions, which may include providing power to the controller by harvesting power from wheel motion, supplying the harvested power to the controller, and/or applying a preset impedance on the terminals of a motor that controls the active suspension actuator. In one embodiment of the system, there may be a central vehicle dynamics controller that issues commands to the active suspension actuator controllers. In one embodiment, the actuator controllers may communicate sensor data to the central vehicle dynamics controller via the communication network, and in one embodiment, external sensors may be connected to the central vehicle dynamics controller to sense wheel movement, body movement, and vehicle state.

According to another aspect, a method of distributed vehicle suspension control comprises controlling a number of vehicle wheels with a number of wheel-specific active suspension actuators disposed in proximity to the wheel and responsible for the wheel's vertical motion. In one embodiment, the actuators may comprise multi-phase electric motors for controlling suspension activity of the single wheel and the actuator may be disposed within a wheel well of a vehicle between the vehicle body and the vehicle wheel. The method further comprises communicating actuator-specific suspension control information over a network that electrically connects the wheel-specific active suspension actuators. In one embodiment, the communication network may be a private network that contains a gateway to the vehicle's communication network and electronic control units. At each wheel-specific actuator the method further comprises localized sensing of motion (which, in some embodiments, is one of wheel displacement, velocity, and acceleration with respect to the vehicle chassis), and processing of the sensing to execute a wheel-specific suspension protocol to control the single vehicle wheel. Wheel velocity may be measured by sensing the velocity of an electric motor that moves in relative lockstep with the active suspension system actuator. In one embodiment, the wheel-specific suspension protocol may comprise wheel suspension actions that facilitate maintaining wheel compliance with a road surface over which the vehicle is operating while mitigating an impact of road surface based wheel movements on the vehicle. In one embodiment, the wheel-specific suspension protocol may include a measure of actuator inertia used as feedback to control the actuator. On a vehicle-wide level the method further comprises the processing of information received over the communication network from any other actuator to execute a vehicle-wide suspension protocol to cooperatively control vehicle motion. In one embodiment, the vehicle-wide suspension protocol may be effected by each controller that controls a single vehicle wheel. In one embodiment, the vehicle-wide suspension protocol may facilitate control of vehicle roll, pitch, and vertical acceleration. Further, in one embodiment of the system, the information received by the controller over the communication network may come from a central vehicle dynamics controller. According to another aspect, a fault-tolerant electronic suspension system comprises a plurality of electronic suspension dampers disposed throughout a vehicle so that each suspension damper is associated with a single wheel. In some embodiments, the electronic suspension damper is a semi-active damper or a fully active suspension actuator. Each damper comprises a separate active suspension controller. Further the fault-tolerant electronic suspension system comprises a communication network for facilitating communication of vehicle chassis control information among the controllers, and at least one sensor disposed with each controller to provide vehicle motion information and controller-specific vehicle wheel motion information to the controller. Further the fault-tolerant electronic suspension system comprises a power distribution bus that provides power to each electronic suspension controller. In one embodiment, a power distribution fault may include a bus-wide fault or an actuator-specific fault. Each electronic suspension controller is capable of independently detecting and responding to power distribution bus fault conditions by self-configuring to provide one of a preset force/velocity dynamic and a semi-active force/velocity dynamic. In one embodiment, the controller may be able to independently respond to power distribution bus fault conditions by regenerating energy harvested in the electronic suspension damper from wheel motion and facilitating the self-configuring. In one embodiment, the controller may further self-configure to provide a fully-active force/velocity dynamic. In one embodiment, the system may comprise an energy storage device operatively connected and proximal to each electronic suspension controller.

According to another aspect, a distributed suspension control system comprises a number of active suspension actuators (which, in some embodiments, may be valveless, hydraulic, linear motor, ball screw, valved hydraulic, or other actuators) that are disposed throughout a vehicle such that each active suspension actuator is associated with a single wheel. Further the system comprises a number of active suspension actuator controllers disposed so that active suspension actuators on a single vehicle axle share a single controller. The distributed suspension control system also comprises a communication network for facilitating communication of vehicle control and sensing information among all of the controllers. Further the system comprises at least one sensor disposed with each controller to provide vehicle chassis motion and/or vehicle wheel motion related information to the controller. Each controller processes information provided by its sensors to execute a wheel specific-suspension protocol to control the two or more wheels with which it is associated. Each controller also processes information received over the communication network from any of the other controllers to execute a vehicle-wide suspension protocol to cooperatively control vehicle motion.

According to another aspect, a power distribution bus and a communication link between a plurality of controller modules disposed throughout a vehicle body comprise a unified communication over power lines architecture.

In one embodiment, such architecture utilizes a high power impedance matching medium, capable of transmitting/receiving high-speed data via one of many commonly known RF technologies. Such communication medium may comprise a highly flexible coaxial cable with impedance matching terminations and RF baluns disposed at each power feed input to each controller module to separate data from raw DC power. An RF transformer extracts/injects data streams into the DC power feed while also attenuating low frequency noise associated with bidirectional DC power flow.

In another embodiment, communication packets are sent over unterminated power lines between a single DC power cable interconnecting all controllers distributed within the vehicle's wheel wells and use the vehicle's chassis as a return path.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 16-1 is an embodiment of an active suspension system topology that includes a distributed active suspension actuator and controller per wheel, power conversion and bus distribution, a communication network and gateway, energy storage, central vehicle processing, and local and central sensors.

FIG. 16-2 is an embodiment of an active suspension system topology that shows distributed actuator controller processors utilizing local sensors to run wheel-specific suspension protocols and a communication network for communicating wheel-specific and vehicle body information.

FIG. 16-3 is an embodiment of a highly-integrated, distributed active valve that includes a controller, electric motor and hydraulic pump located in fluid, a sensor interface, and a communication interface.

FIGS. 16-4 (4A, 4B, 4C and 4D) shows embodiments of communication network topologies for a four node distributed active suspension system with four distributed actuator controllers.

FIG. 16-5 is an embodiment of a three-phase bridge driver circuit and an electric motor with an encoder, phase current sensing, power bus, voltage bus sensing, and a power bus storage capacitor.

FIG. 16-6 shows an embodiment of a set of voltage operating ranges for a power bus in an active suspension architecture.

FIGS. 16-7 (7A and 7B) shows embodiments of open-circuit and short-circuit bus fault modes and the equivalent circuit models for the respective modes.

DETAILED DESCRIPTION

Disclosed herein is a distributed active suspension control system consisting of highly-integrated, distributed, fault-tolerant actuator controllers, wherein the controllers implement a suspension protocol that is split into wheel-specific and vehicle-wide suspension protocols. The advantages of the distributed nature of the methods and systems of distributed active suspension control described herein include improved system performance through reduced latency and faster response time to wheel-specific localized sensing and events, and reduced processing load requirements of a central node, freeing up vehicle-wide resources. Additionally the fault-tolerant nature of the distributed actuators and controllers improves on the reliability and safety of the prior art.

Figure 161:
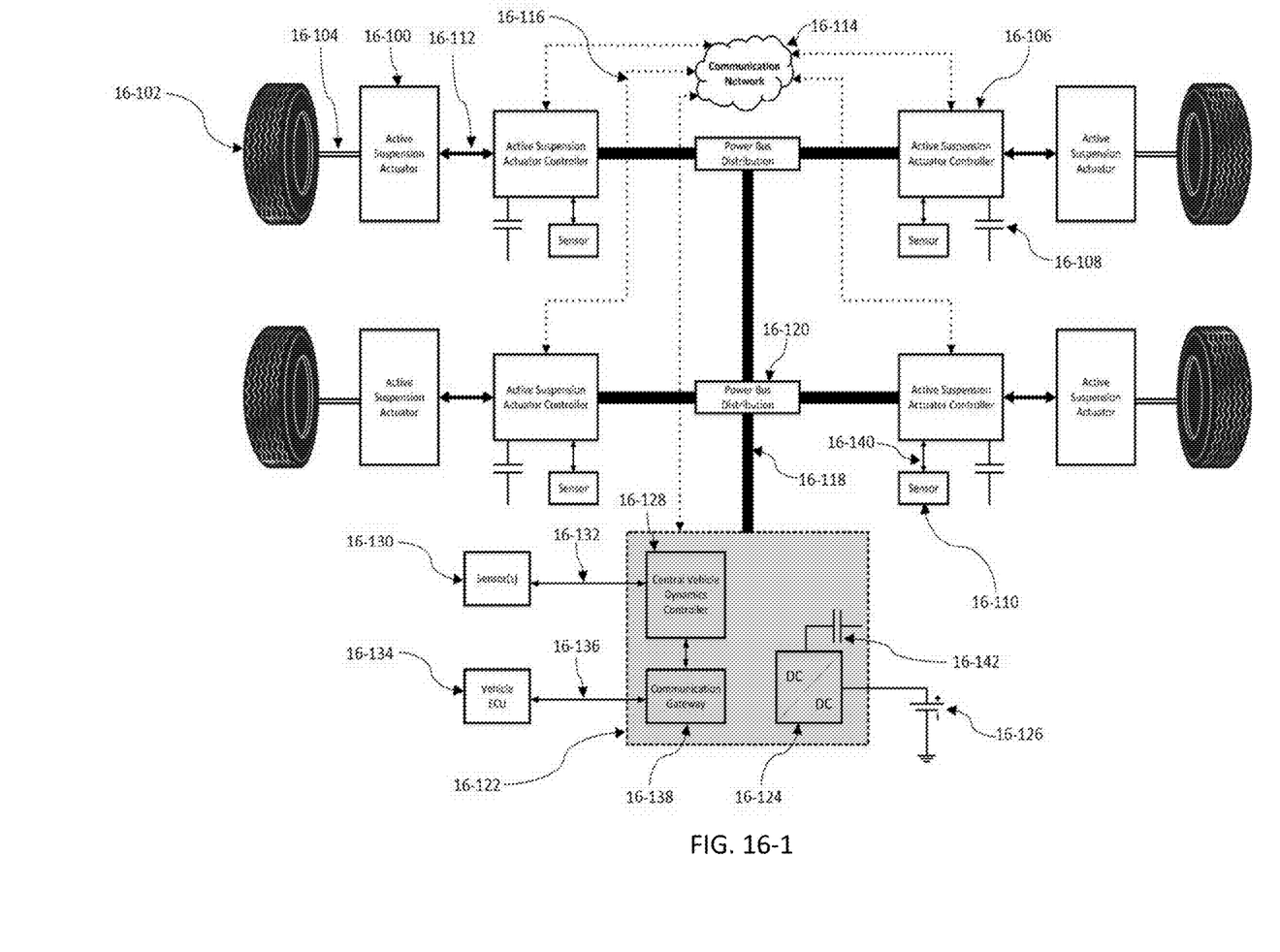

Referring to FIG. 16-1, an embodiment of an active suspension system topology is shown. In the embodiment shown in FIG. 16-1, the active suspension topology has four distributed active suspension actuators 16-100 disposed throughout the vehicle such that each actuator is associated with and proximal to a single vehicle wheel 16-102. The actuators could be valveless, hydraulic, a linear motor, a ball screw, valved hydraulic, or of another actuator design. The actuators are mechanically coupled 16-104 to the vehicle wheel and vehicle chassis such that actuation provides displacement between the vehicle wheel and vehicle chassis. The actuators are individually controlled by separate distributed active suspension actuator controllers 16-106 through a control interface 16-112. Further the active valve system comprises a localized energy storage facility for each active suspension system actuator. In one embodiment, the localized energy storage facility may be one or more capacitors 16-108 operatively coupled to the controller 16-106 to store electrical energy. The controller processes local sensor 16-110 information 16-140 and communication 16-116 received over the communication network 16-114 that connects all of the distributed controllers. The active suspension actuators receive electrical power from a power bus 16-118 through power bus distribution 16-120. The distribution may be any combination of electrical wiring, fuse boxes, and connectors.

In the embodiment shown in FIG. 16-1 the active suspension system has a set of components 16-122 that are not specifically located in a distributed manner on a per vehicle wheel basis. These components include a DC-DC switching power converter 16-124 that converts a vehicle battery 16-126, such as the primary vehicle 12V battery, to a higher voltage for the power bus 16-118. The power converter may be a bi-directional DC-DC switching power converter, which would allow it to pass energy in both directions. The power converter in this embodiment utilizes centralized energy storage 16-142, such as supercapacitors or batteries, to buffer energy to the power bus. When the electrical load on the power bus exceeds the power converter's capabilities, the centralized energy storage can deliver buffered electrical energy. During periods of lighter electrical load, the power converter can recharge the energy storage in anticipation of a future heavy loading. Additionally, the centralized energy storage may serve to buffer electrical energy generated from the actuators in regenerative mode. Energy flowing out of electric motors in the actuators behaving as generators will be stored in the centralized energy storage. The stored energy may be used by the actuators or be transferred to the primary vehicle 12V battery through the power converter. The set of components 16-122 also includes a central vehicle dynamics controller 16-128 that processes external sensor information 16-130 through a sensor interface 16-132, communications received through a communication gateway 16-138 from the vehicle ECU 16-134 over 16-136, and information received over suspension's communication network 16-114. The central vehicle dynamics controller is responsible for executing vehicle-wide suspension protocols that may include skyhook control, active roll control, and pitch control.

Figure 162:
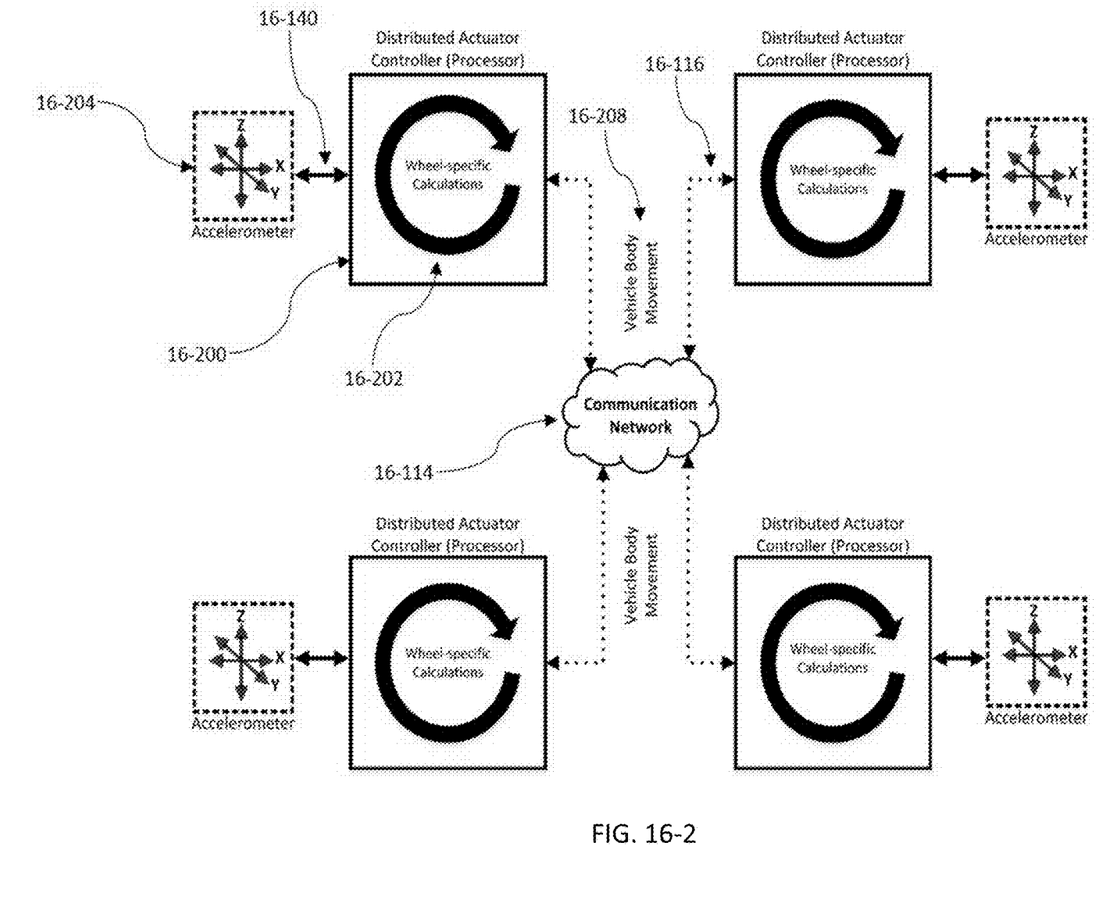

FIG. 16-2 shows an embodiment of wheel-specific processing in an active suspension topology. The processor 16-200 is a subcomponent of the distributed actuator controller 16-106. The processor is typically a microcontroller, FPGA, DSP, or other embedded processor solution, capable of executing software implementing suspension protocols. In the embodiment of FIG. 16-2, the processor receives sensor information 16-140 from a three-axis accelerometer 16-204, which is one example of the local sensing element 16-110, and executes wheel-specific calculations 16-202 for a wheel-specific suspension protocols that may include groundhook control or wheel damping. The processor simultaneously receives vehicle body movement 16-208 and communication 16-116 from other distributed controller processors or a central vehicle dynamics controller over the active suspension communication network 16-114. In this embodiment, the overall active suspension protocol is comprised of two sub protocols, a distributed wheel-specific suspension protocol for calculating wheel control decisions and a vehicle-wide suspension protocol for calculating vehicle-wide decisions. The advantages of dividing the protocol into these two sub protocols include the reduced latency and faster response time with which the wheel-specific control can respond to localized sensing and events, and the reduced processing load requirements of a central node in the distributed network. Thus vehicle-wide decisions such as active roll mitigation can be arbitrated and executed by multiple controllers in conjunction with one another. The distributed actuator controllers are all in communication with each other and the central vehicle controller.

In the embodiment shown in FIG. 16-2, the wheel-specific calculations may include a preset, semi-active, or fully active force/velocity dynamic. The advantage of this approach is that in the event of a communication fault whereby any of the controllers lose communication capabilities, the controller is able to provide suspension actions and does not adversely impact operation of the other controllers in this fault-tolerant distributed network. The remaining controllers in the distributed network can respond to the fault by managing the remaining nodes of the distributed communication network and the behavior of the faulty controller can be monitored through local and central sensor information.

Figure 163:
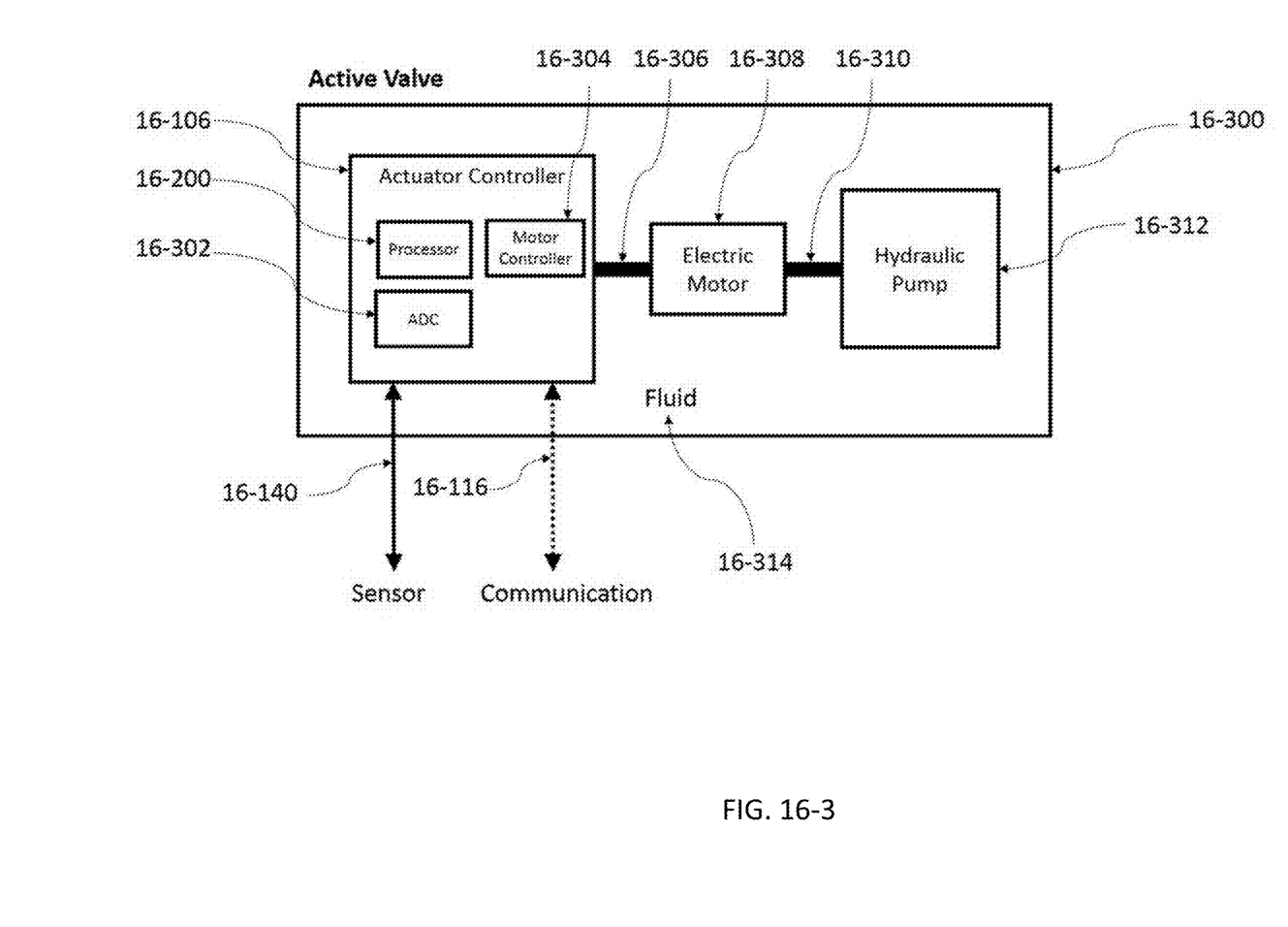
Figure 164:
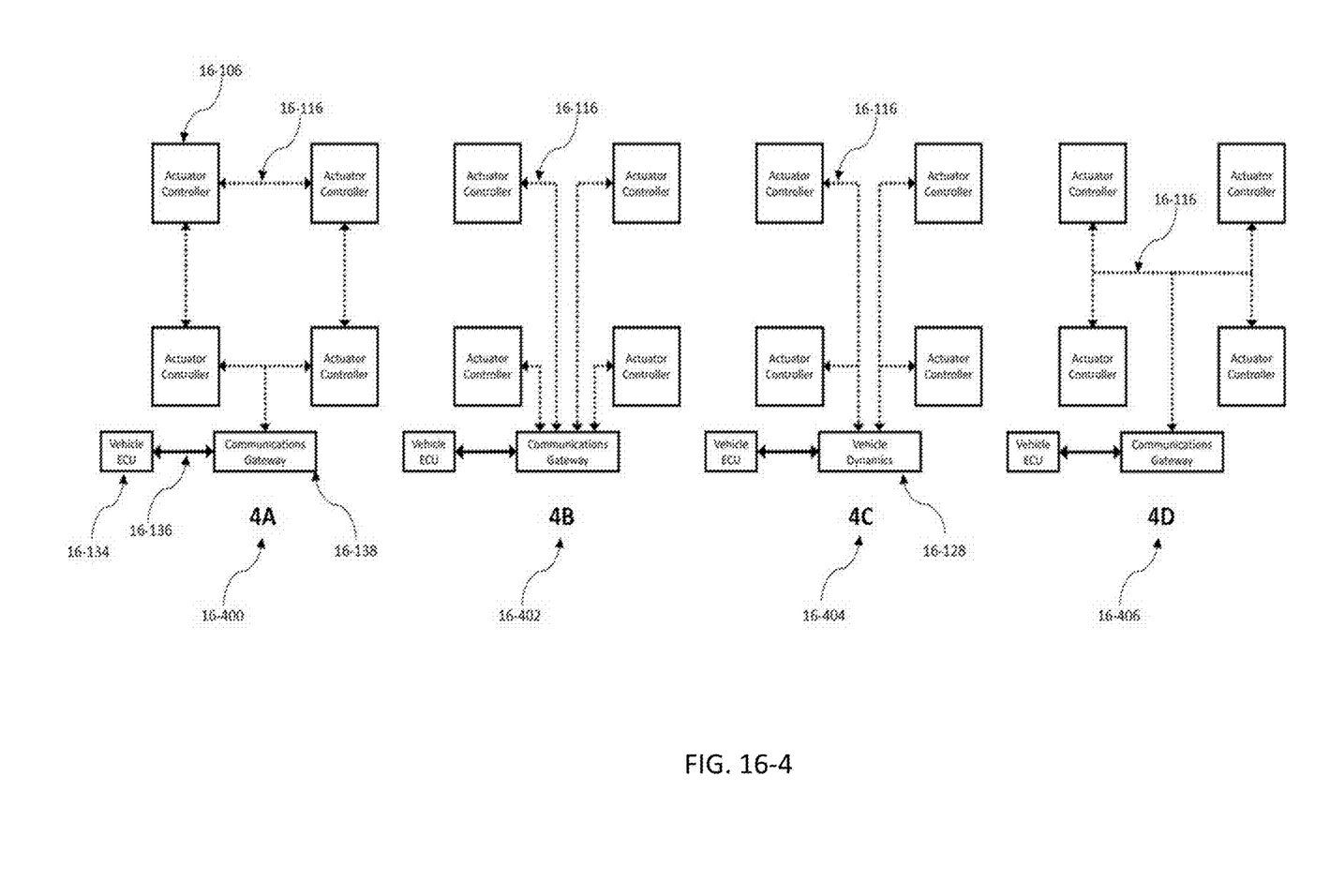

FIG. 16-3 shows an embodiment of a highly integrated, active valve 16-300. The active valve combines the actuator 16-100 and controller 16-106 into an integrated, fluid-filled 16-314 form factor that is compact and more easily disposed in close proximity to the vehicle wheel 16-102. In the embodiment shown in FIG. 16-3, the controller 16-106 is electrically coupled 16-306 to an electric motor 16-308. The electric motor is mechanically coupled 16-310 to the hydraulic pump 16-312 such that hydraulic flow through the pump results in rotation in the electric motor. Conversely, rotation of the electric motor results in hydraulic flow through the pump. In some embodiments of the methods and systems of distributed active suspension control described herein, the electric motor and hydraulic pump are in lockstep whereby position sensing of the electric motor provides displacement information of the hydraulic actuator and velocity sensing of the electric motor provides velocity information of the vehicle wheel 16-102.

The controller in the embodiment of FIG. 16-3 is comprised of the processor 16-200, a motor controller 16-304, and an analog-to-digital converter (ADC) 16-302. The motor controller is an electrical circuit that receives a control input signal from the processor and drives an electrical output signal to the electric motor for control of any one of the motor's position, rotational velocity, torque, or other controllable parameter. For a multi-phase brushless DC electric motor, the motor controller has an element per phase for controlling the flow of current through that phase. The controller receives sensor information 16-140 and communication 16-116 that is used to execute wheel-specific and vehicle-wide suspension protocols. The ADC may be used to condition the sensor information into a form that this interpreted by the processor if the processor cannot do so directly.

FIG. 16-4 shows embodiments of communication network topologies for a four node distributed active suspension system with four distributed actuator controllers 16-106. The key aspect of all network topologies is that all distributed actuators and any central vehicle dynamics controller are capable of communicating with each other. FIG. 16-4A 16-400 shows a ring network topology whereby the communication 16-116 is passed from controller to controller with a single connection to a communication gateway 16-138. A disadvantage of this topology is that it relies on the distributed nodes to relay messages around the ring, whereby a fault-tolerant controller must be designed to maintain basic forwarding capability. It also limits the bandwidth of communication between the gateway and any of the distributed nodes. FIG. 16-4B 16-402 shows a network topology whereby the communication 16-116 to each distributed node passes through a communications gateway to the vehicle ECU. An advantage of this topology is the communication isolation provided such that the nodes are no dependent on each other in their communication to the vehicle ECU. FIG. 16-4C 16-404 shows a network topology whereby each communication connection is shared by two distributed nodes. This topology may be implemented in a vehicle where both wheels on a given side, both wheels in the front or back form the two distributed nodes sharing the communication connection. FIG. 16-4D 16-406 shows a shared network topology whereby every node of the distributed network is connected to the same physical interface. For each embodiment 16-4A, 16-4B, 16-4C, and 16-4D, the present methods and systems of distributed active suspension control described herein may interchange the communication gateway 16-138 and central vehicle dynamics 16-128 components, or use them both in combination, to achieve the desired suspension functionality.

Figure 165:
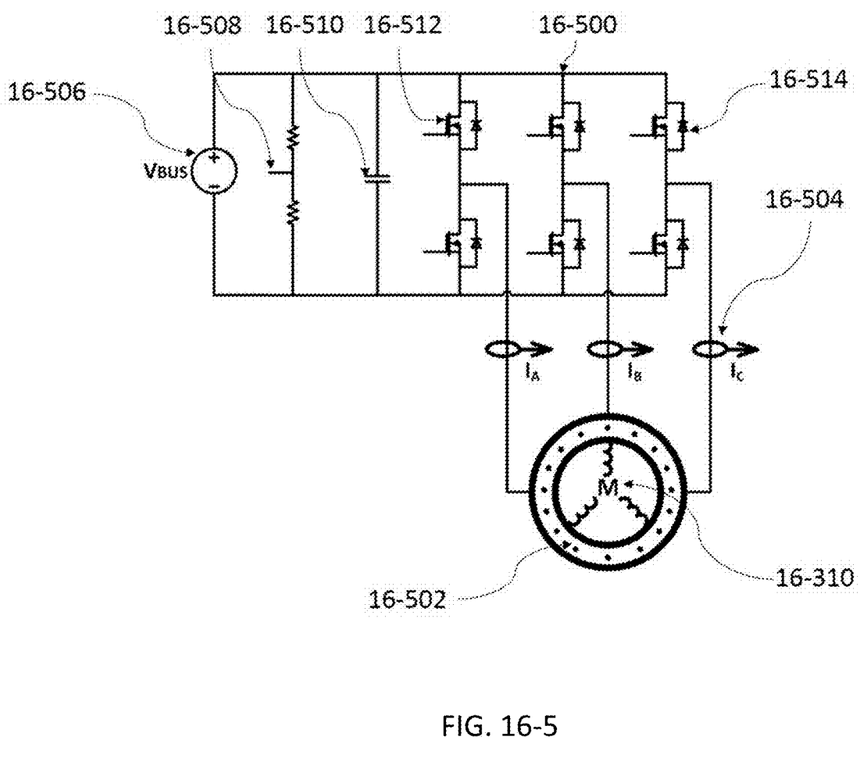

FIG. 16-5 shows an embodiment of a three-phase bridge circuit 16-500 and an electric motor 16-310 with an encoder 16-502, a power bus 16-506, phase current sensing 16-504, voltage bus sensing 16-508, and a storage capacitor 16-510. Each phase of the bridge circuit contains a half-bridge topology with two N-channel power MOSFETS 16-512 and its output stage for controlling the voltage on its respective motor phase.

A three-phase bridge circuit as shown in FIG. 16-5 is typically driven by a set of MOSFET gate drivers capable of switching the low-side and high-side MOSFETs on and off. The gate drivers are typically capable of outputting sufficient current to quickly charge a MOSFET's gate capacitance, thereby reducing the amount of time the MOSFET spends in the triode region where power dissipation and switching losses are greatest. The gate drivers take pulse-width modulated (PWM) inputs signals from a processor running motor control software.

The body diode 16-514 on each N-channel MOSFET 16-512 of the three-phase bridge circuit as shown in FIG. 16-5 plays a key role in the regenerative behavior of the circuit and distributed actuator described in the methods and systems of distributed active suspension control described herein. When the motor rotates and the MOSFETs are not driven, these body diodes act to rectify the back electromotive force (EMF) voltage generated by the motor acting as a generator. The electrical energy that is rectified can be stored in the bus storage capacitor 16-510 and can be used to self-power the circuit.

Figure 166:
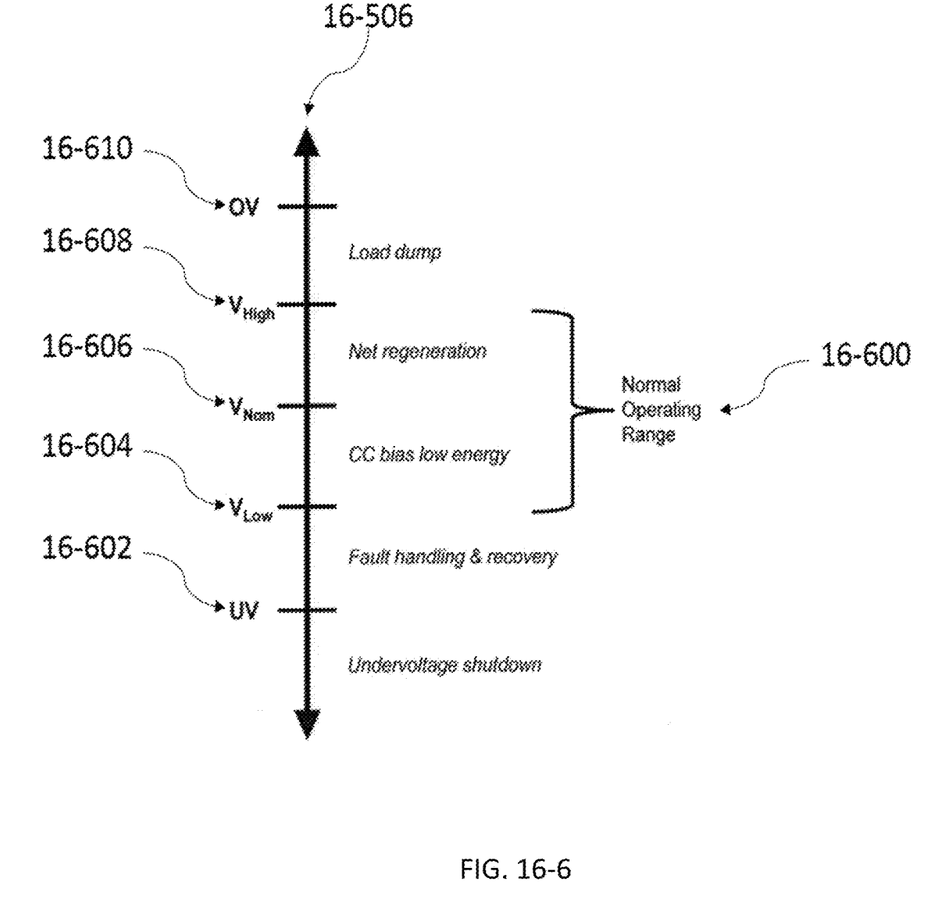

FIG. 16-6 shows an embodiment of a set of voltage operating ranges for a power bus 16-506 in an active suspension architecture. The voltage levels of the bus are important to the operation of the actuators and controllers. On the lowest end of the voltages shown in FIG. 16-6, undervoltage (UV) 16-602 is a threshold below which the system cannot operate. $V_{Low}$ 16-604 is a threshold that indicates a low, but still operational system. Dropping the power bus voltage below $V_{Low}$ begins a fault response in preparation for a possible undervoltage shutdown. $V_{Nom}$ 16-606 indicates the center of the normal operating range 16-600. This is the desired range over which to operate the electrical system. $V_{High}$ 16-608 is a threshold that indicates a high, but still operational system. Exceeding $V_{High}$ and approaching the overvoltage threshold (OV) 16-610 begins a load dump response to remove electrical energy from the power bus and reduce the voltage.

Figure 167:
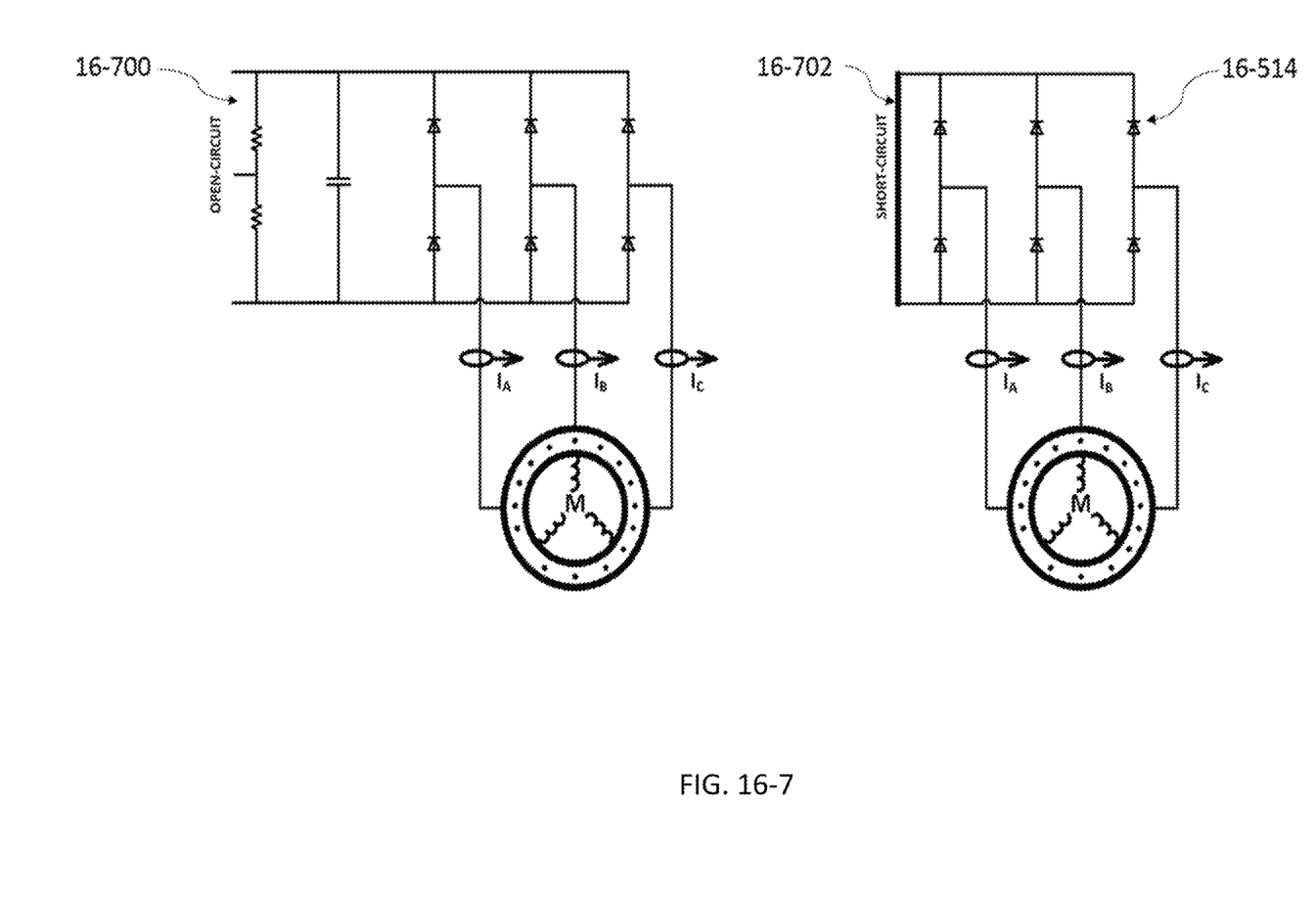

FIG. 16-7 shows an embodiment of two power bus 15-506 fault modes, labelled as open-circuit 16-700 and short-circuit 16-702. In the open-circuit fault mode, the power bus has become disconnected from the shared power bus of the active suspension system 16-118. Under these circumstances, the actuator and controller's performance depend on the state of energy stored on the power bus and the amount of regenerative energy harvested. If the power bus voltage can remain in the normal operating range 16-600 based on stored and regenerated energy, the motor controller will continue to operate. In the short-circuit fault mode, the power bus has its positive and negative terminals shorted, collapsing the bus voltage. Under these circumstances, the motor controller is below the undervoltage threshold 16-602 and the motor performance is fixed.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:
1. A distributed suspension control system, comprising:
   at least a first and a second active suspension actuator associated with a first wheel and a second wheel of a vehicle respectively;
   a first and a second actuator controller associated with the first and the second active suspension actuator respectively;

a communication network that exchanges vehicle control and/or sensing information among at least the first and the second actuator controllers;

at least one sensor associated with the first actuator controller to provide at least one of vehicle chassis motion information and vehicle wheel motion information to the first actuator controller, wherein the first actuator controller processes information provided by the at least one sensor to execute a wheel-specific suspension protocol to control the first vehicle wheel, and wherein the first actuator controller also processes information received over the communication network from at least the second actuator controller to execute a vehicle-wide suspension protocol to at least partially control vehicle motion; and wherein a magnitude of actuator inertia of the first actuator attached to the first wheel is used by the first controller as a control parameter to control a motion of the first wheel.

2. The distributed suspension control system of claim 1, wherein the first actuator controller also processes information received over the communication network from a central vehicle dynamics controller.

3. The distributed suspension control system of claim 2, wherein a portion of the communication network is constructed to exchange information between the first actuator controller and the second actuator controller without passing through a central controller associated with both the first actuator controller and the second actuator controller.

4. The distributed suspension control system of claim 1, wherein each active suspension actuator is interposed between the vehicle chassis and a vehicle wheel.

5. The distributed suspension control system of claim 1, wherein the wheel-specific suspension protocol includes wheel suspension actions that reduce vertical motion of the vehicle chassis during at least one control mode, while maintaining wheel contact with the road surface.

6. The distributed suspension control system of claim 1, wherein the wheel-specific suspension protocol includes wheel suspension actions that dampen wheel movement while mitigating an impact of road surface based wheel movements on the vehicle.

7. The distributed suspension control system of claim 1, wherein the wheel-specific suspension protocol includes a wheel control algorithm and an algorithm for vehicle chassis/body control.

8. The distributed suspension control system of claim 1, wherein at least two controllers run substantially similar control algorithms.

9. The distributed suspension control system of claim 1, wherein the vehicle-wide suspension protocol is used to control at least one of vehicle roll, pitch, and vertical acceleration.

10. The distributed suspension control system of claim 1, wherein at least the first active suspension actuator includes an electric motor for controlling suspension activity of the first wheel.

11. The distributed suspension control system of claim 1, wherein the vehicle chassis comprises one of a car body, a truck chassis, and a truck cabin.

12. The distributed suspension control system of claim 1 wherein control of vehicle motion is control of the vehicle chassis.

13. A distributed active suspension system, comprising:

a plurality of active suspension system actuators disposed throughout a vehicle so that an active suspension system actuator is attached to each vehicle wheel, wherein each actuator comprises an electric motor operatively coupled to a hydraulic pump that is in hydraulic communication with a housing that includes a piston;

an actuator controller associated with each active suspension system actuator, wherein each actuator controller provides commands to the associated electric motor to operate the hydraulic pump to assist the motion of the piston;

a communication network that exchanges information among two or more actuator controllers, wherein a portion of the communication network is constructed to exchange information between a first actuator controller and a second actuator controller without passing through a central controller associated with both the first actuator controller and the second actuator controller; and at least one sensor that provides at least one of vehicle chassis motion information and vehicle wheel motion information to at least one actuator controller, wherein each actuator controller executes wheel-specific suspension protocols and/or vehicle-wide suspension protocols to at least partially and/or cooperatively control vehicle motion.

14. The distributed active suspension system of claim 13, wherein wheel-specific suspension protocols perform groundhook control of at least one of the plurality of active suspension system actuators attached to at least one wheel.

15. The distributed active valve system of claim 13, wherein wheel-specific suspension protocols are used to control the at least one of the plurality of active suspension system actuators attached to at least one wheel at wheel frequencies.

16. The distributed active suspension system of claim 13, wherein vehicle-wide suspension protocols perform at least one of skyhook control, active roll control, and pitch control.

17. The distributed active suspension system of claim 13, wherein vehicle-wide suspension protocols control at least one actuator at body frequencies.

18. The distributed active valve system of claim 13, wherein at least some information exchanged between the first actuator controller and the second actuator controller passes through the portion of the communication network.

19. The distributed active valve system of claim 13, wherein control of vehicle motion is control of the vehicle chassis.

20. A distributed active suspension system, comprising:

a plurality of active suspension system actuators, wherein each active suspension actuator is associated with a vehicle wheel, wherein each actuator is operated in one of an active mode and a regeneration mode;

a plurality of active suspension actuator controllers, wherein each active suspension actuator is associated with a separate controller of the plurality of controllers;

a vehicle communication network electrically connecting the plurality of actuator controllers;

a centralized energy storage facility associated with the plurality of active suspension system actuators; and a plurality of localized energy storage facilities each of which associated with at least one of the plurality of active suspension system actuators, wherein in a first mode of operation, energy is supplied to a first localized energy storage facility that is associated with a first actuator, and in at least a second mode of operation, when energy from the centralized energy storage facility to the first actuator is disrupted, the first actuator operates by consuming at least some energy from the first localized energy storage facility.

21. The distributed active suspension system of claim 20, wherein the localized energy storage facility is at least one capacitor operatively coupled to the controller.

22. The distributed active suspension system of claim 20, further comprising a hydraulic pump, wherein the controller comprises a motor controller which applies torque to the hydraulic pump in the active suspension system actuator.

23. The distributed active suspension system of claim 20, wherein each active suspension actuator of the plurality of active suspension actuators operates in the first and second modes of operation independently of other active suspension actuators of the plurality of active suspension system actuators during a power distribution bus fault condition.

24. The distributed active suspension system of claim 23, wherein supplying energy comprises transferring energy harvested from an electric motor operating within an actuator.

25. The distributed active suspension system of claim 20, wherein the system further comprises a central vehicle dynamics controller that issues commands to the plurality of active suspension actuator controllers.

26. The distributed active suspension system of claim 25, wherein sensor data is communicated from the plurality of active suspension actuator controllers to the central vehicle dynamics controller via the communication network.

27. The distributed active suspension system of claim 25, wherein the system further comprises sensors connected to the central vehicle dynamics controller that sense at least one of wheel movement, body movement, and vehicle state.

28. The distributed active suspension system of claim 20, wherein the communication network comprises at least one of a CAN bus, FlexRay, Ethernet, RS-485, and data-over-power-lines communication bus.

29. The distributed active suspension system of claim 20, wherein energy can flow from the centralized energy storage facility to the plurality of active suspension system actuators over a power distribution bus.

30. The distributed active suspension system of claim 20, wherein energy flow into the energy storage facility comes from at least one of a vehicular high power electrical system, the vehicle primary electrical system, a DC-DC converter, and a regenerative active suspension actuator.

31. The distributed active suspension system of claim 20, wherein each controller of the plurality of controllers independently detects and/or responds to a power distribution bus fault condition.

32. The distributed active suspension system of claim 31, wherein responding to a power distribution bus fault condition includes providing power to the controller by harvesting power from wheel motion and making the harvested power available to the controller.

33. The distributed active suspension system of claim 31, wherein responding to a power distribution bus fault condition includes applying a preset impedance on the terminals of a motor that controls the active suspension actuator.

34. A method of controlling a distributed vehicle suspension system, comprising:
  collecting information about a motion of a vehicle body and/or a first wheel of the vehicle;
  exchanging information over a communication network between a controller of a first actuator interposed between the vehicle body and the first wheel, and a second controller of a second actuator interposed between the vehicle body and a second wheel;
  executing a protocol using the controller of the first actuator;
  providing energy to the first actuator from a first localized energy storage facility; and
  controlling at least one aspect of the motion of the vehicle body and/or first wheel with the first actuator; and
  wherein a magnitude of actuator inertia of the first actuator is used by the first controller as a control parameter to control a motion of at least the first wheel.

35. The method of claim 34, further comprising exchanging information over the communication network with a central vehicle dynamics controller.

36. The method of claim 34, wherein the communication network is a private network for the active suspension system, and further contains a gateway to the vehicle's communication network.

37. The method of claim 34, further comprising sensing at each actuator at least one of, wheel displacement, velocity, and acceleration with respect to the vehicle chassis.

38. The method of claim 34, further comprising measuring a velocity of the first wheel by sensing the velocity of an electric motor operatively coupled to a hydraulic motor pump that moves in relative lockstep with a piston in the first actuator.

39. The method of claim 34, further comprising a vehicle-wide suspension protocol that is implemented at least partially by the controller of the first actuator and the controller of the second actuator.

40. The method of claim 34, further comprising at least one actuator interposed between the vehicle body and each vehicle wheel.

41. The method of claim 34, wherein the protocol implemented with the controller of the first actuator comprises wheel suspension actions that facilitate maintaining wheel compliance with a road surface over which the vehicle is operating while mitigating an impact of road surface based wheel movements on the vehicle.

42. The method of claim 34, wherein the vehicle-wide suspension protocol facilitates control of vehicle roll, pitch, and vertical acceleration.

43. The method of claim 34, wherein the first actuator includes at least one multi-phase electric motor for controlling suspension activity of the first wheel.

44. The method of claim 34, further comprising generating electric energy with an electric motor operatively coupled to a hydraulic motor pump in fluid communication with a volume in the first actuator and storing at least some of the generated energy in the first localized energy storage facility.

45. A fault-tolerant electronic suspension system, comprising:
  a plurality of electronic suspension dampers disposed in a vehicle, wherein each suspension damper is associated with a different vehicle wheel;
  a plurality of electronic damper controllers disposed so that each suspension damper has a separate controller;
  a communication facility of each of the damper controllers for sending and/or receiving information to and/or from at least one other controller;
  at least one sensor associated with each damper controller to provide at least one of vehicle motion information and vehicle wheel motion information to the associated damper controller;
  a centralized energy storage facility accessible to each damper controller under non-fault conditions; and at least one localized energy storage facility accessible to each damper controller, wherein the at least one localized energy storage facility is distinct from the central energy storage facility;

wherein at least one damper controller uses energy from at least one localized energy storage facility to at least partially perform at least one function.

46. The fault-tolerant electronic suspension system of claim 45, wherein the at least one damper controller harvests energy regenerated in the electronic suspension damper from wheel motion and uses the regenerated energy to at least partially perform the at least one function.

47. The fault-tolerant electronic suspension system of claim 45, wherein one localized energy storage device is operatively connected to and proximal to each suspension damper controller.

48. The fault-tolerant electronic suspension system of claim 45, wherein the electronic suspension damper is a semi-active damper.

49. The fault-tolerant electronic suspension system of claim 45, wherein the electronic suspension damper is a fully active suspension actuator.

50. The fault-tolerant electronic suspension system of claim 49, wherein when energy from the centralized energy storage facility is disrupted by a bus fault condition, energy to the damper controllers is provided at least partially from the localized energy storage facilities and/or from energy generated by the plurality of electronic suspension dampers.

51. The fault-tolerant electronic suspension system of claim 50, wherein the bus fault condition is one of a total bus-wide failure and a partial bus.

52. The fault-tolerant electronic suspension system of claim 45, wherein the at least one damper controller uses energy from the at least one localized energy storage facility to at least partially perform the at least one function when the power distribution bus is in a fault condition.

53. A distributed active suspension control system, comprising:
a plurality of active suspension actuators disposed in a vehicle so that an active suspension actuator is associated with each vehicle wheel;
a plurality of active suspension actuator controllers disposed in the vehicle so that active suspension actuators that are associated with a single vehicle axle share a single active suspension actuator controller;
at least one central vehicle dynamics controller;
a communication facility of each actuator controller for exchanging over a communication network vehicle and/or sensing information between the plurality of active suspension actuator controllers; and
at least one sensor associated with each active suspension actuator controller to provide at least one of vehicle chassis and vehicle wheel motion related information to the active suspension actuator controller with which the at least one sensor is associated, wherein each active suspension actuator controller processes information provided by the at least one sensor to execute a wheel-specific suspension protocol to control at least one vehicle wheel with which the active suspension actuator controller is associated, and at least two active suspension actuator controllers of the plurality of active suspension actuator controllers process at least one of vehicle motion related information and wheel motion related information received over the communication network to execute a vehicle-wide suspension protocol to cooperatively control vehicle motion.

54. The distributed suspension control system of claim 53, further comprising a localized energy storage facility that is operatively connected to at least an active suspension actuator controller.

55. The distributed active suspension control system of claim 53, wherein the at least one of vehicle motion related information and wheel motion related information received over the communication network by the at least two active suspension actuator controllers is received from a separate active suspension controller.

56. A distributed suspension control system, comprising:
a first active suspension actuator associated with a first wheel and a first actuator controller;
a second active suspension actuator associated with a second wheel and a second actuator controller;
a communication network that exchanges vehicle control and/or sensing information between at least the first actuator controller and the second actuator controller; and
at least one sensor associated with the first actuator controller to provide at least one of vehicle chassis motion information and vehicle wheel motion information to the first actuator controller, wherein the first actuator controller processes information provided by the at least one sensor to execute a wheel-specific suspension protocol to control the first vehicle wheel, and wherein the first actuator controller also processes sensor information received over the communication network from at least the second actuator controller to execute a vehicle-wide suspension protocol to at least partially control vehicle motion.

* * * * *